May 29, 1962 C. E. HEIN 3,036,445
FLEXIBLE COUPLING
Filed Jan. 14, 1960 2 Sheets-Sheet 1
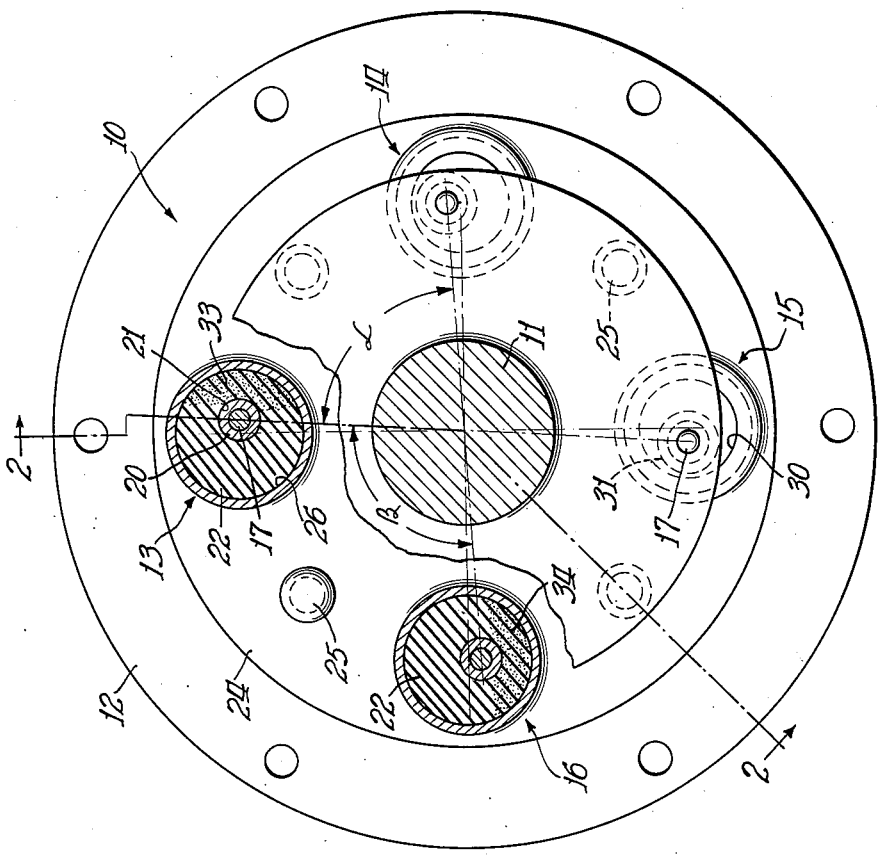
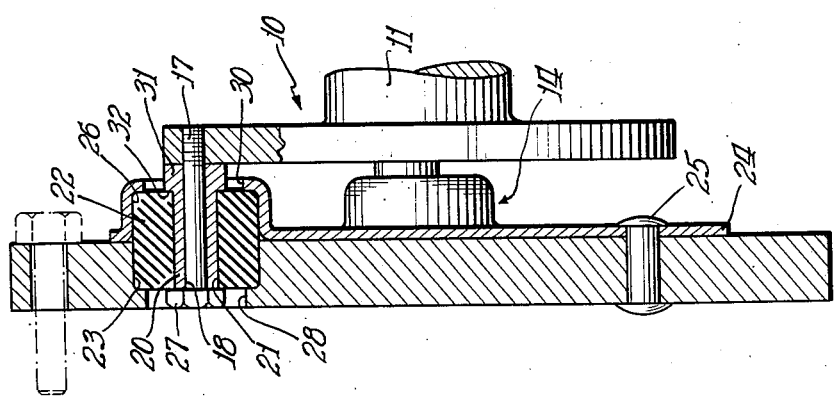
Inventor:
Charles E. Hein
By: Joseph R. Dwyer Atty.

May 29, 1962  C. E. HEIN  3,036,445
FLEXIBLE COUPLING
Filed Jan. 14, 1960  2 Sheets-Sheet 2
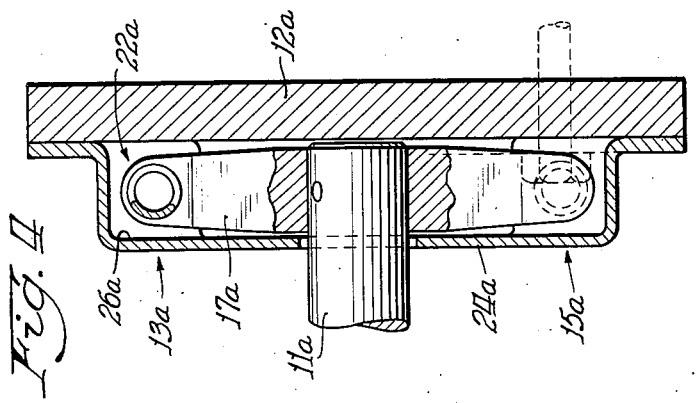
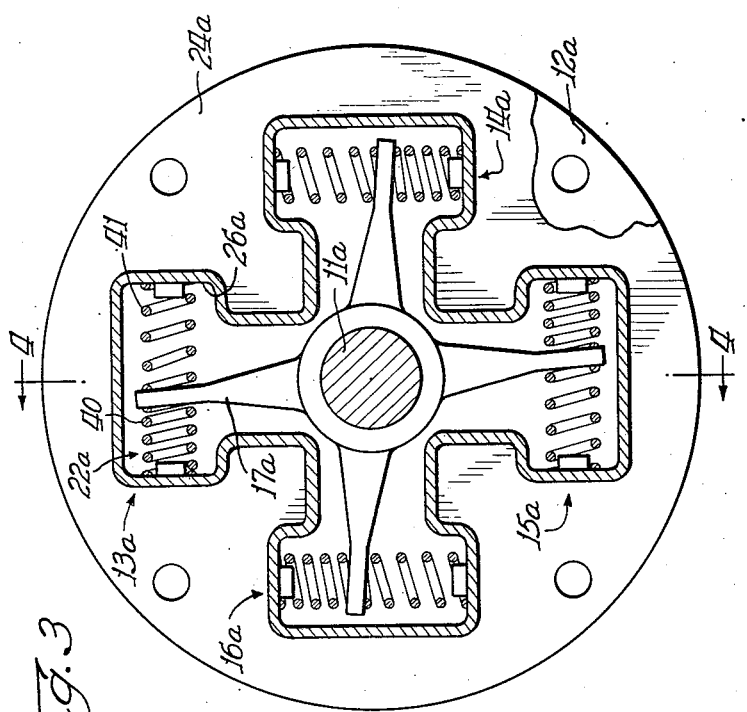
Inventor:
Charles E. Hein
By: Joseph R Dwyer Atty.

United States Patent Office 3,036,445
Patented May 29, 1962

3,036,445
FLEXIBLE COUPLING
Charles E. Hein, Newfield, N.Y., assignor to Morse Chain Company, Ithaca, N.Y., a corporation of New York
Filed Jan. 14, 1960, Ser. No. 2,409
8 Claims. (Cl. 64—11)

The present invention relates, generally, to coupling devices adapted to join a pair of rotatable members, and, more particularly, to couplings of the flexible type capable of absorbing torsional vibrations.

In any rotational system, there exists a natural frequency and associated harmonics at which a disproportionately large amplitude of vibration occurs as the system rotates. This phenomenon is a function of the mass and the flexibility of the members joined comprising the system. When such a system is subjected to torque fluxuations which transmit repetitive forces to the system resulting in torsional vibration, the amplitude of the vibration created by the external forces may reinforce the amplitude at the natural frequency thereby causing a vibration capable of literally shaking the system to pieces.

Heretofore, in most flexible couplings adapted to absorb torsional vibrations, their ability to reduce large amplitudes thereof have been limited because their reaction or resistive force varied directly or linearly with the force applied thereto. Such couplings are often referred to as linear couplings and could not "detune" the system.

It is an object of this invention to provide a coupling which is non-linear in its resistance to torsional vibration and which is effective to reduce the amplitudes of torsional vibration and effectively vary the natural frequency of the rotational system.

Briefly, this invention comprises a flexible coupling which will react against induced torsional vibration by torque fluxuations in a non-linear manner and thus discourage large amplitudes of torsional vibration by effectively and continually detuning the system. In this manner the forces which repeat at the natural frequency of the system are continuously opposed or resisted by the coupling and prevented from inducing large amplitudes. In the specific embodiments disclosed herein the means for accomplishing this detuning comprises a plurality of prestressed resilient elements which will resist torsional vibration by the successive loading and unloading of such resilient elements at predetermined values of force. As will be apparent from a more detailed description hereinafter, the prestressing of these resilient elements is such that they oppose one another below a predetermined amplitude and reinforce one another above such predetermined amplitudes and thus load and unload in opposition or add to one another, within predetermined limits, and thus vary the torsional resistance in a non-linear manner.

Therefore, it is another object of the present invention to provide a coupling capable of joining a pair of rotatable members, one of which has repetitive torsional forces applied thereto, wherein the coupling is effective to reduce or have a detuning action in operating ranges at or near the natural or resonant frequency of the system.

Still a more particular object of this invention to provide flexible coupling which will produce a reaction force to torsional vibration which will increase in a non-linear fashion as the amplitude of the vibration increases by the successive unloading and loading of a number of prestressed resilient elements at predetermined values of the amplitude force.

The foregoing objects and advantages, as well as numerous others, will become more apparent from the following detailed description, when read in conjunction with the appended drawings, wherein:

FIGURE 1 is a partial sectional view of one embodiment of this invention showing in detail the structure thereof;

FIGURE 2 is an axial view of the embodiment of FIGURE 1 taken along line 2—2 of FIGURE 1;

FIGURE 3 is a full sectional view of another embodiment of the present invention;

FIGURE 4 is a partial sectional side view of the embodiment shown in FIGURE 3 taken along line 4—4 of FIGURE 3.

Referring now to the drawings wherein like numerals are employed to denote like parts in the various views, the coupling constructed in accordance with the teachings of this invention is indicated in its entirety as 10. Coupling 10 comprises a first member 11, herein designated as the input member, and a second relatively flat plate member 12, herein designated as the output member. The input member and output member may be of any desired size as is necessary for a specific application or use. The two members 11 and 12 are resiliently coupled to each other by a plurality of resilient coupling means; four such means being shown and indicated in their entirety as 13, 14, 15 and 16. For simplicity, however, the construction of resilient coupling means 13 only will be described, it being understood that the construction of the other resilient coupling means are identical thereto.

As can be more clearly seen in FIGURE 2, coupling means 13 comprises a projection, in the form of a stud 17, secured to the input member 11 and extending parallel to the axis of rotation of the input member radially outwardly therefrom, and received in a bore 18 in a bushing spacer 20. Bushing spacer 20 is, in turn, received in an aperture 21 formed in a resilient deformable member 22. Member 22 may be of any suitable resilient or elastic material, such as rubber, natural or synthetic; or of any elastic form such as a spring.

Resilient member 22 is partially received in an axially extending bore or pocket 23 located radially outwardly of the axis of rotation of the members 11 and 12 the same radial distance as the center of the stud 17 is from the axis of rotation of these members. A face plate 24 is attached to the front face of the output member 12 facing the input member 11 by any suitable means, such as by rivets 25. The face plate 24 is provided with a pocket 26 which opens toward the front face of the output member to receive the remaining portion of the deformable means 22 thereby enclosing it and securing it to the output member 12. Thus, with the resilient member 22 secured to the output member 12, nut means 27 on stud 17 serves to secure the input member 11 to the output member 12 yet form a resilient connection therebetween. Relative movement between the input and output members is permitted by bore 28 of sufficient diameter to space the walls thereof from the nut 27 and by bore or aperture 30 spaced from the flange 31 of bushing 20. Flange 31 serves to space the input member axially from the output member and its shoulder 32 cooperates with the nut 27 to also add in securing the bushing 20 to the resilient member 22.

Turning now to FIG. 1, the specific arrangement of the studs 17 on member 11 is illustrated with respect to the preferred embodiment of the subject invention. It is seen that the axes of the respective projections 17 are not circumferentially equally spaced about the axis of rotation of the coupling. By extending radial lines from the axis of rotation through the axes of the studs 17, and measuring the angles defined by the radial lines of pairs of adjacent studs, it is found that certain of the angles, for instance alpha, is of a lesser magnitude than certain other of the angles, for instance beta, formed between certain other adjacent pairs of studs 17. By this arrangement, the studs 17 are mounted in misalignment with respect to the center of the respective adjacent apertures 21 formed in the resilient means of the member 12. Thus, as can be appreciated, as between any adjacent coupling means the deformable members thereof being formed with centers or bores 21 so as to be concentric to bores 23, will be prestressed in one direction or the other depending upon the angular displacement of the stud members from one another in relation to the angular displacement of the centers of the bores 23.

Thus, in order to assemble the respective coupling means, it can be seen that it is necessary to rotate either the output member or the input member clockwise or counter-clockwise after having inserted some of the studs in the bores 18 and force or distort the resilient members so that the remainder of the studs 17 may be received in their respective bores 18. When this insertion of the studs is accomplished some of the deformable members will react against the other deformable members and will relax into a prestressed final position. This is illustrated by way of example in FIGURE 1 by the stippled area 33 in coupling means 13 and 34 in resilient coupling means 16.

From the above description, it can be seen that when torsional vibration is introduced, for example, clockwise, an additional stressing and reaction to this movement will be resisted by the resilient coupling 13 with a force proportional to the amplitude of the vibration and the type of material used in the member 22, with little or no effect on the coupling 16. At such time, however, as the amplitude of the vibration clockwise increases so that the prestressed portion 34 of resilient coupling 16 is eliminated and the resilient member is forced or distorted in a direction opposite to its original prestressed condition, such reaction force will be added to the force of the resilient coupling means 13. It can be seen that this reversal in stress on the coupling member 16 at the time of an increase in amplitude introduces a non-linear resistance to amplitude force and tends to cause the same to detune or prevent continued oscillation. Too, a reversal of the direction, i.e. counter-clockwise, of vibration is resisted and detuned in a similar manner.

While this invention has been described in connection with resilient coupling means 13 and 16, it is obvious that the circumferential misalignment of resilient coupling means 14 and 15 operate in a similar manner and also while this invention has been described utilizing four resilient coupling means, three or more resilient coupling means may be used. Too, resilient coupling means 13, 15 and 14, 16 are shown diametrically opposed. The circumferential misalignment and consequently the non-linear function of this coupling means 10 could be varied according to the variation in the angles between the resilient coupling means.

Turning now to FIGURES 3 and 4, there is seen another embodiment of this invention utilizing spring means to perform the function of the resilient means in the embodiment disclosed in FIGURES 1 and 2. To facilitate the understanding of this embodiment, parts having the same function and operation in this embodiment are given the same reference numerals as those parts in the embodiment shown in FIGURES 1 and 2 except that the suffix a has been added.

In this embodiment, the driven member 12a is provided with four resilient coupling means 13a–16a, one of which will be described to simplify the description. As can be seen, resilient coupling means 13a has a pocket 26a formed in face plate 24a in which is enclosed a resilient or deformable means 22a comprising two springs 40 and 41. Springs 40 and 41 react against the side walls of the pocket 26a and against a radially disposed projection means 17a which in this embodiment comprises a radially extended spoke affixed to and forming part of the driving member 11a. It is to be noted that the projections or spokes 17a extending into the resilient or deformable means 22 are misaligned with respect to the centers of the pockets 26a of each of the coupling means 13a–16a in a manner similar to the misalignment of the studs 17 of the embodiment shown in FIGURES 1 and 2. As clearly seen in FIGURE 3, the resilient means 22, because of the misalignment of the projections or spokes 17a, are prestressed and function substantially identically to detune torsional vibration as hereinabove explained.

While the circumferential misalignment has been described in connection with the input member by arranging the studs on member 11, or the spokes on member 12a, it is to be understood that a circumferential misalignment could be accomplished by making the pockets 26 or 26a on the driven member misaligned with equi-angular studs or spokes on the driving member.

Furthermore, while I have described my invention in connection with specific constructions and arrangements, it is to be understood that this is by way of illustration and not by way of limitation and the scope of my invention is defined solely by the appended claims which should be construed as broadly as the prior art will permit.

I claim:

1. In a torque transmitting coupling subject to torsional vibration: means defining an input member, means defining an output member, and resilient means for coupling said members including means for creating a non-linear resistance to torsional vibration, comprising resilient means disposed on one of said members and joining means disposed on the other of said members, said joining means being circumferentially eccentric to said resilient means so that when said resilient means and said joining means are interengaged said resilient means are prestressed circumferentially.

2. In a torque transmitting coupling subject to torque fluctuations: means defining an input member, means defining an output member, and resilient means for coupling said members including means for creating a non-linear resistance to torsional deflections, comprising resilient means disposed on one of said members and joining means disposed on the other of said members, said joining means being circumferentially eccentric to said resilient means so that when said resilient means and said joining means are interengaged, the resilient means is prestressed circumferentially.

3. In a torque transmitting coupling subject to torque fluctuations: means defining an input member, means defining an output member: and elastic means for coupling said members including means for creating a non-linear resistance to torsional deflections, comprising a plurality of elastic means disposed on one of said members, a plurality of joining means disposed on the other of said members, each of said joining means being interengaged with an associated resilient means, said joining means being eccentric to the relaxed center of said elastic means so that said resilient means are prestressed circumferentially when interengaged.

4. In a torque transmitting coupling subject to torque-fluctuations; means defining an input member, means defining an output member, and resilient means for coupling said members including means for creating a non-linear resistance to torsional deflections, comprising a plurality of resilient means disposed on one of said members, a plurality of joining means disposed on the other of said members, each of said joining means being interengaged with an associated resilient means, said joining means being circumferentially eccentric to the relaxed center of said resilient means, the eccentricity of some of said joining means being in the clockwise direction while the eccentricity of other of said joining means being in the counter-clockwise direction thereby causing some of said associated resilient means to be prestressed in the counter-clockwise direction and others of said elastic means to be prestressed in the clockwise direction thereby resulting in a non-linear resistance to torsional deflections in both directions.

5. In a coupling device, a first member having a plurality of elastic means, and a second member having a plurality of joining means, means in said elastic means to receive said joining means, said joining means being circumferentially eccentric to said elastic means disposed on said second member and received in said elastic means thereby causing prestressing of the elastic means resulting a predetermined rate of resistance to an increasing amplitude of torsional vibration below a predetermined value and a substantially increased rate of resistance to an increasing amplitude of torsional vibration above said predetermined value.

6. A coupling device as set forth in claim 5 wherein said elastic means comprises a rubber-like material of a substantially toroidal shape.

7. A coupling device as set forth in claim 5 wherein the elastic means comprises circumferentially disposed springs.

8. In a rotatable flexible coupling device having an axis of rotation and adapted to provide a nonlinear response to torsional vibration: a first rotatable member having a plurality of elastic means symmetrically disposed thereon, and a second rotatable member having a plurality of projections thereon for interengaging said elastic means for joining said first member and said second member; said projections being disposed on said second member radially outwardly of said axis of rotation of said coupling device, each said projections being further disposed with respect to an immediately adjacent projection at an angle defined by radial lines extending from the axis of rotation through said projections of said coupling device, certain of said angles being of a less magnitude than other of said angles defined by radial lines passing through another immediately adjacent projection, whereby said projections prestress said elastic means when inter-engaged therewith to provide nonlinear resistance to torsional vibration.

References Cited in the file of this patent

UNITED STATES PATENTS

| | | |
|---|---|---|
| 2,154,385 | Riesing | Apr. 11, 1939 |
| 2,574,573 | Libby | Nov. 13, 1951 |
| 2,621,493 | Croset | Dec. 16, 1952 |
| 2,622,418 | Howison | Dec. 23, 1952 |
| 2,622,419 | McIntyre | Dec. 23, 1952 |
| 2,895,316 | Kloud | July 21, 1959 |
| 2,909,911 | Spaetgens | Oct. 27, 1959 |